United States Patent
Jang et al.

(10) Patent No.: US 12,495,224 B2
(45) Date of Patent: Dec. 9, 2025

(54) IMAGE SENSING DEVICE AND IMAGE PROCESSING METHOD OF THE SAME

(71) Applicant: Samsung Electronics Co., Ltd., Suwon-si (KR)

(72) Inventors: Chan Young Jang, Suwon-si (KR); Hee Kang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 166 days.

(21) Appl. No.: 18/184,835

(22) Filed: Mar. 16, 2023

(65) Prior Publication Data
US 2023/0300481 A1    Sep. 21, 2023

(30) Foreign Application Priority Data
Mar. 16, 2022    (KR) .......................... 10-2022-0032783

(51) Int. Cl.
*H04N 25/78*    (2023.01)
*G06T 5/70*    (2024.01)
(Continued)

(52) U.S. Cl.
CPC .............. *H04N 25/67* (2023.01); *G06T 5/70* (2024.01); *G06V 10/764* (2022.01); *H04N 23/86* (2023.01);
(Continued)

(58) Field of Classification Search
CPC ........ H04N 25/67; H04N 23/86; H04N 25/11; H04N 25/78; H04N 9/646; H04N 25/133;
(Continued)

(56) References Cited

U.S. PATENT DOCUMENTS 9,083,877 B2    7/2015    Ogawa
9,998,715 B2    6/2018    Koizumi
(Continued)

FOREIGN PATENT DOCUMENTS

JP    2002171440 A  *  6/2002
JP    2007/116292 A    5/2007
(Continued)

OTHER PUBLICATIONS

JP2002171440_Description (Year: 2002).*
Xiaofeng Chen, Hongyang Yan, Qiben Yan, Xiangliang Machine Learning for Cyber Security (Year: 2020).*

*Primary Examiner* — Twyler L Haskins
*Assistant Examiner* — Surafel Yilmakassaye
(74) *Attorney, Agent, or Firm* — Harness, Dickey & Pierce, P.L.C.

(57) ABSTRACT

An image processing device and an image processing method are provided. The image processing device includes an image sensor configured to sense and output a raw image and an image signal processor configured to compare pixel values of the raw image with a reference level to classify a saturation color image and a non-saturation color image, calculate a first fixed pattern noise from the saturation color image, calculate a second fixed pattern noise from the non-saturation color image, generate a final fixed pattern noise by combining the first fixed pattern noise with the second fixed pattern noise, and output a revised image by subtracting the final fixed pattern noise from the raw image.

20 Claims, 10 Drawing Sheets

(51) Int. Cl.
*G06V 10/764* (2022.01)
*H04N 23/86* (2023.01)
*H04N 25/11* (2023.01)
*H04N 25/67* (2023.01)

(52) U.S. Cl.
CPC ............. *H04N 25/11* (2023.01); *H04N 25/78* (2023.01); *G06T 2207/20224* (2013.01)

(58) Field of Classification Search
CPC .. H04N 25/677; H04N 25/674; H04N 25/134; H04N 23/84; H04N 25/75; H04N 25/772; G06T 5/70; G06T 2207/20224; G06V 10/764; G06V 10/56
See application file for complete search history.

(56) References Cited

U.S. PATENT DOCUMENTS

| | | |
|---|---|---|
| 10,339,672 B2 | 7/2019 | Park et al. |
| 10,362,214 B2 | 7/2019 | Inagaki |
| 2009/0046177 A1* | 2/2009 | Lee ................ H04N 25/677 348/241 |
| 2013/0235276 A1* | 9/2013 | Ogawa ............ H04N 25/704 348/703 |
| 2013/0335601 A1 | 12/2013 | Shiota et al. |
| 2017/0242134 A1* | 8/2017 | Matsuoka ............ H04N 5/32 |
| 2019/0218407 A1* | 7/2019 | Borras ............ H04L 63/0442 |
| 2022/0014697 A1* | 1/2022 | Cote ................ H04N 25/683 |

FOREIGN PATENT DOCUMENTS

| | | |
|---|---|---|
| JP | 2017055330 A | 3/2017 |
| JP | 6353233 B2 | 7/2018 |
| JP | 20210026096 A | 2/2021 |

* cited by examiner

| Gr | Gr | R  | R  | Gr | Gr | R  | R  |
|----|----|----|----|----|----|----|----|
| Gr | Gr | R  | R  | Gr | Gr | R  | R  |
| B  | B  | Gb | Gb | B  | B  | Gb | Gb |
| B  | B  | Gb | Gb | B  | B  | Gb | Gb |
| Gr | Gr | R  | R  | Gr | Gr | R  | R  |
| Gr | Gr | R  | R  | Gr | Gr | R  | R  |
| B  | B  | Gb | Gb | B  | B  | Gb | Gb |
| B  | B  | Gb | Gb | B  | B  | Gb | Gb |
| Gr | Gr | R  | R  | Gr | Gr | R  | R  |
| Gr | Gr | R  | R  | Gr | Gr | R  | R  |

| | W | W | W | G | G | G | W | W | W | G | G | G |
|---|---|---|---|---|---|---|---|---|---|---|---|---|
| K3 | W | W | W | G | G | G | W | W | W | G | G | G |
| | W | W | W | G | G | G | W | W | W | G | G | G |
| | R | R | R | W | W | W | B | B | B | W | W | W |
| | R | R | R | W | W | W | B | B | B | W | W | W |
| | R | R | R | W | W | W | B | B | B | W | W | W |
| | W | W | W | G | G | G | W | W | W | G | G | G |
| | W | W | W | G | G | G | W | W | W | G | G | G |
| | W | W | W | G | G | G | W | W | W | G | G | G |
| | B | B | B | W | W | W | R | R | R | W | W | W |
| U3 | B | B | B | W | W | W | R | R | R | W | W | W |
| | B | B | B | W | W | W | R | R | R | W | W | W |

210c

IMAGE SENSING DEVICE AND IMAGE PROCESSING METHOD OF THE SAME

CROSS-REFERENCE TO RELATED APPLICATION

This application claims priority from Korean Patent Application No. 10-2022-0032783 filed on Mar. 16, 2022 in the Korean Intellectual Property Office and all the benefits accruing therefrom under 35 U.S.C. 119, the contents of which in its entirety are herein incorporated by reference.

BACKGROUND

Technical Field

The present disclosure relates to image sensing devices and image processing methods.

Description of the Related Art

An image sensing device may be used in a mobile device, such as a smartphone, a tablet and a digital camera, or various electronic devices. The image sensing device is configured such that fine pixels are two-dimensionally integrated, and converts an electrical signal corresponding to brightness of incident light into a digital signal and outputs the converted digital signal. In this case, the image sensing device includes an analog-to-digital converter to convert an analog signal corresponding to brightness of light into a digital signal.

Main examples of an image sensor include a charge coupled device (CCD) image sensor and a complementary metal-oxide semiconductor (CMOS) image sensor. The CCD image sensor has less noise and excellent image quality as compared with the CMOS image sensor. The CMOS image sensor has a simple driving mode and can be implemented in various scanning methods. Also, since the CMOS image sensor can integrate signal processing circuits into a single chip, it is easy to miniaturize the product. Further, the CMOS image sensor can compatibly use the CMOS process technologies, resulting in low manufacturing costs. The CMOS image sensor also consumes very low power and thus can be easily applied to a mobile device.

The CMOS image sensor may be abbreviated as a CIS (CMOS image sensor). The CIS may include a plurality of pixels arranged to be two-dimensional. Each of the pixels may include, for example, a photodiode (PD). The photodiode may serve to convert incident light into an electrical signal.

Recently, with the development of computer industry and communication industry, the demand for an image sensor with improved performance has been increased in various fields, such as a digital camera, a camcorder, a smart phone, a game device, a security camera, a medical micro camera and a robot.

BRIEF SUMMARY

An object of the present disclosure is to provide image sensing devices that may reduce noise in an image sensor of which pixel sensitivity is varied.

Another object of the present disclosure is to provide image sensing devices that may provide high resolution by removing a fixed pattern noise, which is adaptively calculated by classifying saturation level images depending on pixel sensitivity, from a raw image.

An example embodiment of the present disclosure is an image processing device including an image sensor configured to sense and output a raw image and an image signal processor configured to compare pixel values of the raw image with a reference level to classify a saturation color image and a non-saturation color image, calculate a first fixed pattern noise from the saturation color image, calculate a second fixed pattern noise from the non-saturation color image, generate a final fixed pattern noise by combining the first fixed pattern noise with the second fixed pattern noise, and output a revised image by subtracting the final fixed pattern noise from the raw image.

Another example embodiment of the present disclosure is an image processing device connected to an image sensor, the image processing device including processing circuitry configured to compare pixel values of a raw image based on a reference level to classify the pixel values into a saturation color image and a non-saturation color image, generating a first fixed pattern noise in consideration of a saturation pixel from the saturation color image, generate a second fixed pattern noise from the non-saturation color image, generate a final fixed pattern noise by combining the first fixed pattern noise with the second fixed pattern noise, and generate a revised image by removing the final fixed pattern noise from the raw image.

Another example embodiment of the present disclosure is an image processing method of an image sensing device, the image processing method including classifying a raw image received from an image sensor into a saturation color image and a non-saturation color image by comparing the raw image with a reference level per pixel, calculating a first fixed pattern noise from the saturation color image, calculating a second fixed pattern noise from the non-saturation color image, generating a final fixed pattern noise by combining the first fixed pattern noise with the second fixed pattern noise and outputting a revised image by removing the final fixed pattern noise from the raw image.

The objects of the present disclosure are not limited to those mentioned above and additional objects of the present disclosure, which are not mentioned herein, will be clearly understood by those skilled in the art from the following description of the present disclosure.

BRIEF DESCRIPTION OF THE DRAWINGS

FIGS. 4 to 6 are views illustrating a pixel array according to some example embodiments.

DETAILED DESCRIPTION OF THE DISCLOSURE

Figure 1:
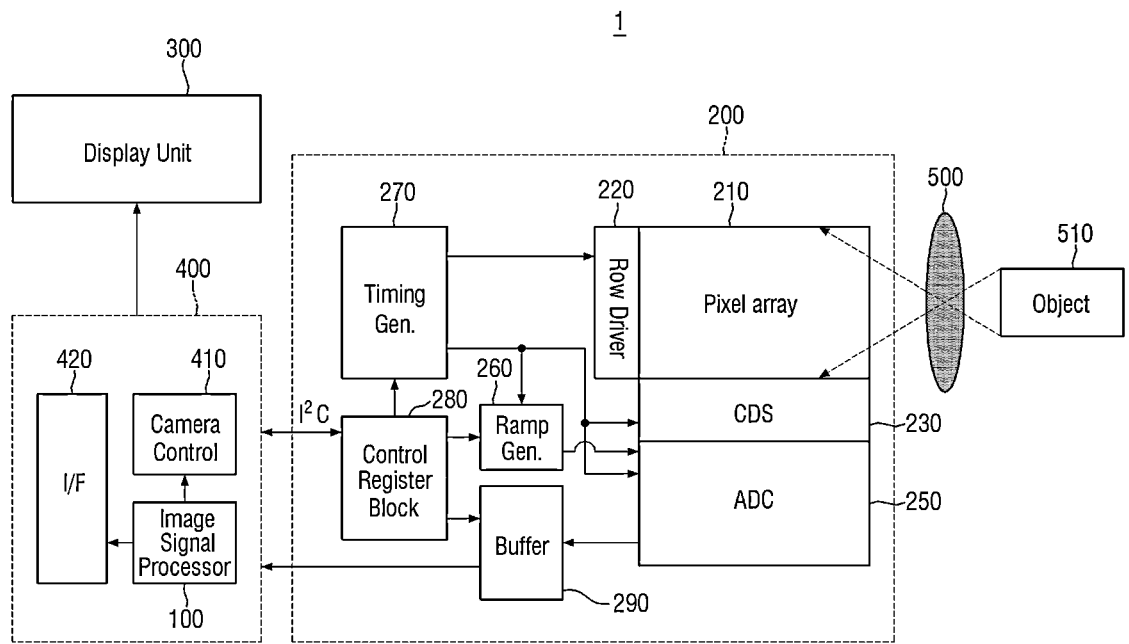
FIG. 1 illustrates an image sensing device according to some example embodiments.

Hereinafter, some example embodiments according to technical spirits of the present disclosure will be described with reference to the accompanying drawings.

Terms such as "unit" and "module" used in the detailed description or functional blocks shown in the drawings may be implemented in the form of hardware, software, or combination thereof, which is configured to perform a specific function.

FIG. 1 illustrates an image sensing device according to some example embodiments.

Referring to FIG. 1, an image sensing device 1 according to some example embodiments may be implemented as a portable electronic device, such as a digital camera, a camcorder, a mobile phone, a smart phone, a tablet personal computer (PC), a personal digital assistant (PDA), a mobile internet device (MID), a wearable computer, an Internet of things (IoT) device, or an Internet of Everything (IoE) device.

The image sensing device according to some example embodiments may include a display unit 300, a digital signal processor (DSP) 400, and an image sensor 200. The image sensor 200 may be, for example, a CMOS image sensor.

The image sensor 200 includes a pixel array 210, a row driver 220, a correlated double sampling (CDS) block 230, an analog digital converter (ADC) 250, a ramp signal generator 260, a timing generator 270, a control register block 280, and a buffer 290.

The image sensor 200 senses an object 510 photographed through a lens 500 under the control of the DSP 400, and the DSP 400 may output an image output by being sensed by the image sensor 200 to the display unit 300.

In accordance with some example embodiments, the image sensor 200 may receive a raw image from pixel array 210 and perform analog binning through the ADC block 250 and the buffer 290 to output the binned image to the DSP 400.

The display unit 300 includes all devices capable of outputting or displaying an image. For example, the display unit 300 may mean a computer, a mobile communication device, and other image output terminals.

The DSP (digital signal processor) 400 includes a camera control 410, an image signal processor (ISP) 100, and an interface (I/F) 420.

The camera control 410 controls an operation of the control register block 280. The camera control 410 may control the operation of the image sensor 200, that is, the control register block 280 by using an inter-integrated circuit (I2C), but the technical spirits of the present disclosure are not limited thereto.

The ISP 100 receives image data output from the buffer 290, processes the received image data to be viewed by a person, and outputs the processed image data to the display unit 300 through the I/F 420.

In accordance with some example embodiments, the ISP 100 may process the image data output from the image sensor 200. The ISP 100 may output the digitally binned image to the display unit 300 as a final binning image. In this case, the image output from the image sensor 200 may be a raw image from the pixel array in accordance with some example embodiments, or may be a binned image in accordance with some example embodiments. Although some example embodiments are possible, in the present disclosure, it is expressed that the image data is output from the image sensor 200 for convenience of description.

Although the ISP 100 is shown as being positioned inside the DSP 400 in the embodiment of FIG. 1, the ISP 100 may be positioned inside the image sensor 200 in accordance with some example embodiments. In accordance with still some example embodiments, the image sensor 200 and the ISP 100 may be implemented as one package, for example, a multi-chip package (MCP).

The pixel array 210 includes a plurality of pixels arranged in the form of a matrix. Each of the plurality of pixels includes a photo sensing element (or a photoelectric conversion element), and a readout circuit that outputs a pixel signal, e.g., an analog signal corresponding to charges generated by the photo sensing element. The photo sensing element may be implemented as a photo diode or a pinned photo diode.

The row driver 220 may activate each of the plurality of pixels. For example, the row driver 220 may drive the pixels implemented in the pixel array 210 in units of rows. For example, the row driver 220 may generate control signals capable of controlling the operation of the plurality of pixels respectively included in the plurality of rows.

In accordance with the control signals, the pixel signal output from each of the plurality of pixels is transmitted to the CDS block 230.

The CDS block 230 includes a plurality of CDS circuits. Each of the CDS circuits may perform correlated double sampling for pixel values output from each of a plurality of column lines implemented in the pixel array 210 in response to at least one switch signal output from the timing generator 270, and may compare the correlated double sampled pixel values with a ramp signal output from the ramp signal generator 260 to output a plurality of comparison signals.

The ADC block 250 may convert each of the plurality of comparison signals into a digital signal and output the plurality of digital signals to the buffer 290.

The ramp signal generator 260 outputs the ramp signal Vramp to the CDS block 230. The ramp signal Vramp ramps from the reference level to be compared with a reset signal Vrst, rises to the reference level, and ramps again from the reference level to be compared with an image signal Vim.

The timing generator 270 may control the operation of the row driver 220, the ADC block 250, the CDS block 230, and the ramp signal generator 260 under the control of the control register block 280.

The control register block 280 controls the operation of the timing generator 270, the ramp signal generator 260, and the buffer 290 under the control of the DSP 400.

The buffer 290 may transmit image data corresponding to the plurality of digital signals (Pixel Array ADC output) output from the ADC block 250 to the DSP 400.

The raw image data outputted from the pixel array 210 through the CDS block 230 and the ADC block 250 may be Bayer image data comprised of Bayer format. In accordance with some example embodiments, the ISP 100 may receive and process the raw image data from the image sensor 200 as an input image to output an output image. For example, the ISP 100 may output a revised image, from which fixed pattern noise is removed, from the raw image data. The output image is displayed on the display unit 300.

The raw image data may result in fixed pattern noise due to a microlens structure and arrangement of the image sensor 200. In particular, for resolution, the pixel array is gradually reduced like a Tetra structure, a Nona structure, etc., and at least two pixels are disposed to share one microlens. When the microlens is misaligned from its original position, pixel sensitivity is different for each color, or there is electrical or optical crosstalk, the fixed pattern noise in a saturation area cannot be efficiently removed from the raw image. For example, the fixed pattern noise may mean a pattern in which pixels (e.g., white) with relatively high pixel sensitivity in an RGBW (Red, Green, Blue, White) pattern are first saturated and pixels of the other colors are not saturated. The fixed pattern noise will be described later in detail with reference to FIGS. 7a to 9b.

According to some example embodiments, in order to efficiently remove the fixed pattern noise from the raw image, a separate fixed pattern noise is calculated by classifying a saturation image and a non-saturation image for each color, and a revised image having higher resolution may be obtained by removing the fixed pattern noise from the raw image.

Therefore, the ISP 100 may remove the fixed pattern noise from the raw image, and may output the output image, from which the fixed pattern noise is removed, to the display unit 300.

For example, the ISP 100 classifies the raw image into a saturation color image and a non-saturation color image, calculates a separate fixed pattern noise from each of the saturation color image and the non-saturation color image, generates a final fixed pattern noise by combining the calculated fixed pattern noises, and subtracts the final fixed pattern noise from the raw image, thereby generating a revised image having higher resolution. More detailed description of the operation of the ISP 100 will be made with reference to FIG. 7.

Figure 2:
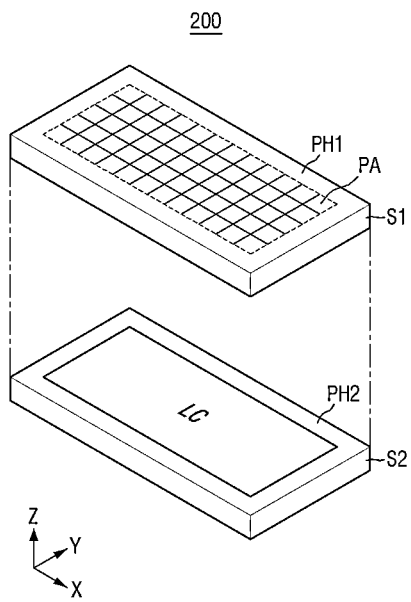
FIG. 2 is a perspective view of the image sensing apparatus of FIG. 1
Figure 3:
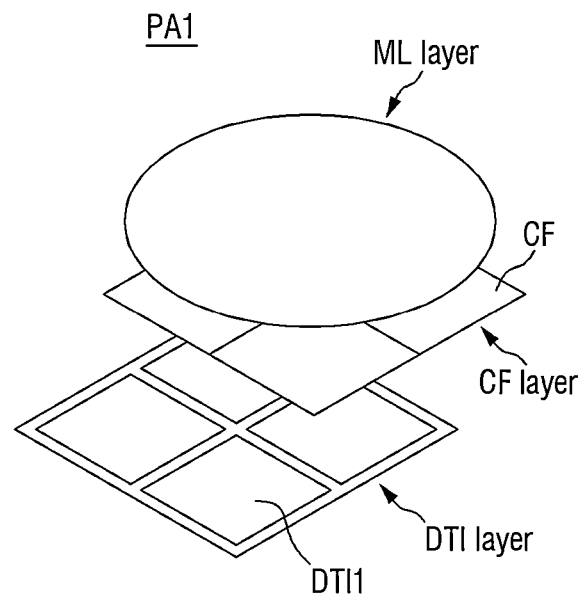
FIG. 3 is a view conceptually illustrating a configuration of the pixel array area of FIG. 1.

FIG. 2 is a perspective view of the image sensing apparatus of FIG. 1 and FIG. 3 is a view conceptually illustrating a configuration of the pixel array area of FIG. 1.

Referring to FIG. 2, the image sensor 200 may be implemented as a stack of a plurality of layers. The pixel array 210 may be implemented on a first layer 51, and the rest of the image sensor 200, e.g., a logic circuit LC, may be implemented on a second layer S2. The logic circuit LC may include all the elements of the image sensor 200, except for the pixel array 210. That is, a pixel array region PH1 and a logic circuit region PH2 may be stacked (e.g., vertically stacked) on a wafer level.

Referring to FIG. 3, a pixel array PA1 may be comprised of a micro-lens (ML) layer, a color filter (CF) layer, and a deep trench isolation (DTI) layer in due order from an upper surface.

At least one ML layer may be disposed on each subpixel area in accordance with some example embodiments. The ML layer may be disposed above each subpixel area. Although not shown, at least two shared microlenses ML may be disposed above the subpixels belonging to a unit pixel group in accordance with some example embodiments.

That is, a phase of subpixels below one shared microlens may be detected from a pixel value between a first subpixel disposed below one side of the shared microlens and a second subpixel disposed below the other side of the shared microlens. At this time, the first subpixel and the second subpixel are adjacent to each other.

In accordance with some example embodiments, a color filter corresponding to each subpixel group area may be disposed. In the shown example, the color filter may be disposed in a tetra pixel structure, a nona pixel structure, and the like. The color filter may be disposed between the microlens layer and a light shielding layer. The light passing through the corresponding color filter may be converted into a pixel signal through a pixel group.

In accordance with some example embodiments, each subpixel area may include at least two types of light shielding layers (DTI layers). Each light shielding layer corresponds to the alignment of the microlens, and thus may be implemented to correspond to each subpixel area.

Figure 4:
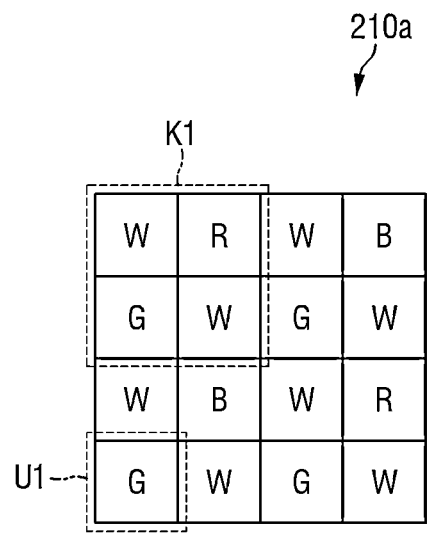

FIGS. 4 to 6 are views illustrating a pixel array according to some example embodiments.

The pixel array 210 may be disposed in a Bayer pattern in accordance with some example embodiments.

The raw image may act in units of kernel (K1). The kernel may include at least two R (red) pixels, at least four G (green) pixels, at least six W (white) pixels, and at least two B (blue) pixels in accordance with some example embodiments. Although expressed as a kernel herein, the kernel may be referred to as another name, such as a window, a unit, a region of interest (ROI) area, etc., in accordance with some example embodiments.

Referring to FIG. 4, the Bayer pattern includes a first column in which W (White) and G (Green) pixels are repeatedly disposed in one unit pixel group, a second column in which R (Red), W (white), B (Blue) and W (White) pixels are disposed, a third column in which W (White) and G (Green) pixels are repeatedly disposed, and a fourth column in which B (Blue), W (white), R (Red) and W (white) pixels are disposed. That is, the Bayer pattern may be disposed in such a manner that color pixels U1 of each color may be included therein one by one.

In accordance with one embodiment, in a pixel array 210a shown in FIG. 4, the kernel K1 may be a 2×2 size, but the present disclosure is applicable to a kernel of various sizes.

Alternatively, the Bayer pattern may include a plurality of R (red) pixels, a plurality of B (blue) pixels, a plurality of G (green, Gr and Gb) pixels, and a plurality of W (white) pixels in one unit pixel group. That is, the Bayer pattern may have an array structure in which color pixels U of each color are disposed in a 2×2 array, a 3×3 array, or the like.

Referring to FIG. 5, as an example, a unit kernel K2 in a pixel array 210b of the raw image may be a Bayer pattern in which color pixels of a Tetra structure are disposed. That is, color pixels U2 of each color may include Gr pixels of a 2×2 array, R pixels of a 2×2 array, B pixels of a 2×2 array, and Gb pixels of a 2×2 array. Alternatively, the color pixels U2 may include 2×2 arrays of R, G, B, or W pixels.

Alternatively, referring to FIG. 6, as an example, a unit kernel K3 in a pixel array 210c of the raw image may be a Bayer pattern in which color pixels of a Nona structure are disposed. That is, color pixels U3 of each color may include R pixels of a 3×3 array, G pixels of a 3×3 array, B pixels of a 3×3 array, and W pixels of a 3×3 array.

In addition, although not shown, the unit kernel may have a structure in which color pixels of an N×N array (N is a natural number of 2 or more) are disposed in a Bayer pattern in accordance with some example embodiments.

FIGS. 7a to 9b are views illustrating a fixed pattern noise according to pixel sensitivity.

Figure 7A:
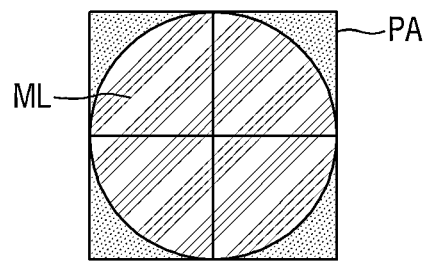
FIGS. 7a and 7b are views illustrating alignment of a microlens on the pixel array PA and optical characteristics of each pixel.
Figure 7B:
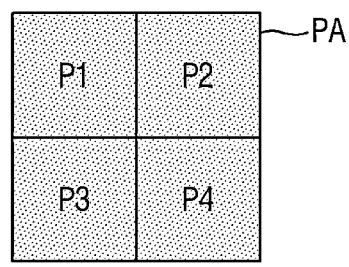

FIGS. 7a and 7b are views illustrating alignment of a microlens on the pixel array PA and optical characteristics of each pixel.

Referring to FIGS. 7a and 7b, in accordance with some example embodiments, the microlens ML may be disposed at a right position on the 2×2 pixel array PA. That is, the alignment between the microlens ML and the pixel array PA is well-matched (non-misalign), so that light may be equally incident on all the pixels P1 to P4 included in the pixel array PA.

However, according to some example embodiments, the microlens ML may be disposed to be misaligned on the 2×2 pixel array PA. For example, a center point of the microlens ML and a center point of the pixel array PA may not be matched with each other.

Figure 8A:
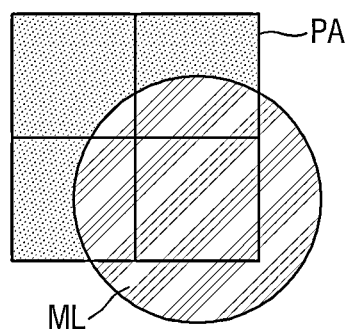
FIGS. 8a and 8b are views illustrating alignment of a microlens on the pixel array PA and optical characteristics of each pixel.
Figure 8B:
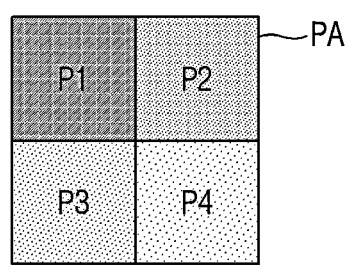

FIGS. 8a and 8b are views illustrating alignment of a microlens on the pixel array PA and optical characteristics of each pixel.

Referring to FIG. 8a and FIG. 8b, for example, due to a process or other problem, alignment between the microlens and the pixel array may be misaligned such that the center point of the microlens may be positioned below a right side (e.g., within the pixel P4). Depending on the amount of incident light, the amount of charges sensed in each pixel of the pixel array may not be uniform based on the boundary of the microlens as shown in FIG. 8b. That is, light is most strongly incident on the pixel P4, light is hardly incident on the pixel P1, and light of a middle level may be incident on the pixels P2 and P3.

Figure 9A:
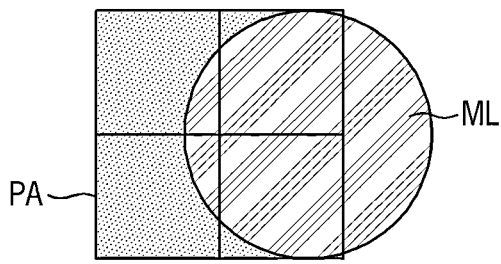
FIGS. 9a and 9b are views illustrating alignment of a microlens on the pixel array PA and optical characteristics of each pixel.
Figure 9B:
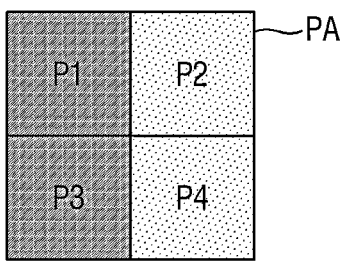

FIGS. 9a and 9b are views illustrating alignment of a microlens on the pixel array PA and optical characteristics of each pixel.

Referring to FIGS. 9a and 9b, for example, due to a process or other problem, an alignment between the microlens and the pixel array may be misaligned such that the center point of the microlens may be pushed to a right side (e.g., a boundary area between pixels P3 and P4). Depending on the amount of incident light, the amount of charges sensed in each pixel of the pixel array may not be uniform based on the boundary of the microlens as shown in FIG. 9b. That is, the large amount of light is incident on the pixels P2 and P4, whereas the relatively small amount of light may be incident on the pixels P1 and P3.

Therefore, the amount of light sensed in the pixel array may be different depending on the alignment of the microlens disposed on the pixel array. Also, as described with reference to FIGS. 4 to 6, since the pixel array for each color included in the kernel is varied, the amount of incident light may be varied depending on the alignment of the microlenses, pixel sensitivity for each color, electrical/optical crosstalk or the position of the pixel, so that the fixed pattern noise may appear in the raw image.

Figure 10:
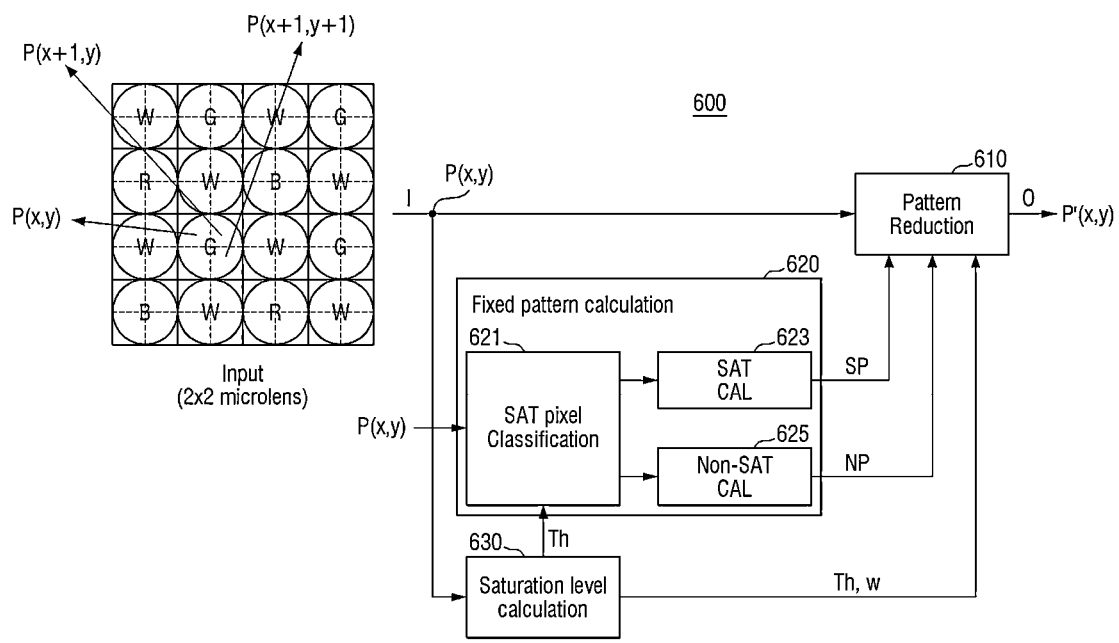
FIG. 10 is a block diagram illustrating an image processing device according to some example embodiments.
Figure 11:
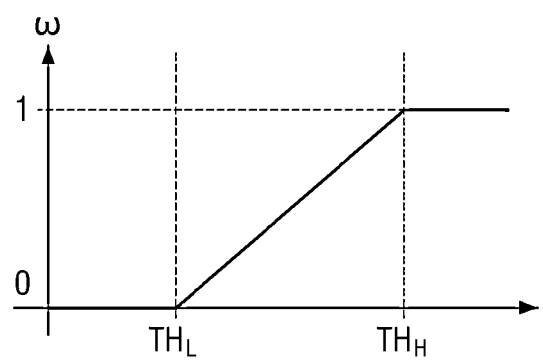
FIG. 11 is a graph illustrating a weight value change based on a reference level of a pixel in accordance with some example embodiments.

FIG. 10 is a block diagram illustrating an image processing device according to some example embodiments. FIG. 11 is a graph illustrating a weight value change based on a reference level of a pixel in accordance with some example embodiments.

Referring to FIG. 10, an image processing device 600 may include a fixed pattern remover 610 (e.g., a pattern reduction unit) and a fixed pattern calculator 620. The image processing device 600 of FIG. 7 may be the ISP 100 of FIG. 1 in accordance with some example embodiments.

The fixed pattern remover 610 removes the final fixed pattern noise from a raw image I, which is received from the image sensor, to output a revised image O. The fixed pattern remover 610 may generate the final fixed pattern noise from the fixed pattern calculator 620 based on a phase image calculated from each of a saturation color image and a non-saturation color image.

The fixed pattern calculator 620 may include a saturation pixel classification unit 621, a saturation pixel calculation unit 623, and a non-saturation pixel calculation unit 624.

The raw image may have a plurality of color images classified depending on the color filter. For example, in the case that the color filter is R (red), G (green), B (blue), and W (white), the raw image may be a combination of a plurality of color images sensed when R-color filter, G-color filter, B-color filter and W-color filter are respectively applied.

According to some example embodiments, the saturation pixel classification unit 621 performs "hard thresholding" to classify the saturation pixel and the non-saturation pixel based on whether a pixel value of at least one color is saturated. The saturation pixel classification unit 621 may determine whether a color channel value included in the kernel is saturated. That is, the saturation pixel classification unit 621 may classify the saturation pixel (e.g., using a saturation pixel grouping) and the non-saturation pixel (e.g., using a non-saturation pixel grouping) depending on whether the pixel value calculated from the amount of light sensed for each pixel P(x,y) constituting the raw image exceeds a reference level (for example, the reference level may be a threshold Th, and there may be a plurality of reference levels as discussed below). For example, when at least one of W (white) pixel values in any one kernel (e.g., kernel A) is the reference level or more, it is determined that all of the W pixels belonging to the kernel A are saturated, and the W pixels are transmitted to the saturation pixel calculation unit 623. The other B pixels, G pixels and R pixels in the kernel A are transmitted to the non-saturation pixel calculation unit 625 as far as there is no saturation pixel.

For another example, when both any one W pixel and any one R pixel of W and R pixels belonging to the kernel A have a pixel value that exceeds the reference level, all W pixels and all R pixels, which belong to the kernel A, are transmitted to the saturation pixel calculation unit 623, and the other B and G pixels are transmitted to the non-saturation pixel calculation unit 625.

In accordance with some example embodiments, the reference level Th used by the saturation pixel classification unit 621 may be received from a saturation level calculator 630.

In the example described above, when at least one specific color pixel belonging to the kernel A exceeds the reference level, the corresponding color pixels are classified as saturation color pixels. However, in accordance with some example embodiments, the number of pixels classified as saturation color pixels may be set to one or more.

That is, the saturation pixel classification unit 621 performs hard thresholding for determining whether the corresponding pixels are saturated by comparing a pixel value of a specific color within the corresponding kernel with the reference level.

The saturation pixel calculation unit 623 calculates the first fixed pattern noise SP in consideration of the saturated pixel in the saturation pixels (e.g., the saturation pixel grouping) classified by the saturation pixel classification unit 621. The first fixed pattern noise SP is a pixel pattern value of the saturated pixels.

The non-saturation pixel calculation unit 625 calculates the second fixed pattern noise NP in the non-saturation pixels (e.g., the non-saturation pixel grouping) classified by the saturation pixel classification unit 621. The second non-saturation pixel calculation unit 625 may calculate the fixed pattern noise without considering saturation when calculating the fixed pattern noise NP unlike the saturation pixel calculation unit 623. The second fixed pattern noise NP is a pixel pattern value of the non-saturated pixels.

There is a phase between the pixel and the adjacent pixel, both which shares the same microlens. For example, when 2×2 sub-pixels share one microlens, the raw image has a phase pattern in the frequency domain presented a pattern around the location (e.g., (0, π), (π,0), (π, π)) of the high frequency element. To cancel the phase pattern in the raw image, a pattern cancelling filter is used (for example, 7×7 size of the pattern cancelling filter is described in FIG. 13.) a coefficient of the pattern cancelling filter varies according to the kernel size, a bandwidth of the filter The first fixed pattern noise SP is calculated in accordance with Equation 1.

$$SP = \frac{N}{N_{SP}} \cdot \sum f(x, y) \cdot P(x, y) \cdot Idx_{SP}(x, y) \quad \text{<Equation 1>}$$

The second fixed pattern noise NP is calculated in accordance with Equation 2.

$$NP = \frac{N}{N - N_{SP}} \cdot \sum f(x, y) \cdot P(x, y) \cdot (1 - Idx_{SP}(x, y)) \quad \text{<Equation 2>}$$

(which N is a number of color channel, $N_{SP}$ is a number of the saturated color channel, f(x,y) is a coefficient of the pattern cancelling filter, P(x,y) is a pixel value of pixel (x,y). $Idx_{SP}(x,y)$ is 1 when the pixel is saturated and 0 when the pixel is non-saturated. For example, N=4 in RGBW bayer pattern pixel, $N_{SP}$ is 1 when only red color (R) pixel is saturated and the other color pixels are non-saturated.

The image signal processor 600 may further include the saturation level calculator 630. The saturation level calculator 630 may extract the aforementioned reference level Th and a weight value w from the raw image I. In accordance with some example embodiments, the saturation level calculator 630 may output the reference level Th extracted to the saturation pixel classification unit 621, and may output the extracted reference level Th and the weight value w to the fixed pattern remover 610.

In accordance with some example embodiments, the saturation level calculator 630 may store and output a reference level and a weight value ω, which are defined in accordance with user definition. Alternatively, in accordance with some example embodiments, the saturation level calculator 630 may use a reference level Th and a weight ω, which are extracted to correspond to the pixels P(x,y) from a plurality of reference levels Th preset by pre-learning the raw image I or otherwise programmed. In accordance with some example embodiments, the reference level Th and the weight value w may be varied for each image sensor 200 (FIG. 1), or may be adaptively varied depending on a situation in which an object 510 is photographed (e.g., a photographing time zone, an outdoor/indoor position of an object/a subject, a static subject/dynamic subject, or a remote/near/super-close distance) even for the same image sensor.

The saturation level calculator 630 may store a reference range within a predetermined (or, alternatively, desired) range based on the reference level Th. In accordance with some example embodiments, the reference range (Th range) may be a plurality of sub-reference values having a reference level Th defined in accordance with user definition and a level within a predetermined (or, alternatively, desired) range (e.g., Th−a<Th range<Th+b, a and b are positive real numbers) based on the defined reference level. At this time, Th−a may be the lowest reference level, and Th+b may be the highest reference level. For example, an area between the lowest reference level and the highest reference level, which is shown in FIG. 11, may be regarded as the reference range. In accordance with some example embodiments, the reference range (Th range) may be a plurality of sub-reference values calculated by an arithmetic expression by being preset from an input raw image or pre-learned through machine learning.

In accordance with some example embodiments, the fixed pattern remover 610 generates final fixed pattern noise by combining the first fixed pattern noise SP with the second fixed pattern noise NP. For example, the first fixed pattern noise SP and the second fixed pattern noise NP may be combined with each other by weighted average within the reference range based on the reference level, and the first fixed pattern noise and the second fixed pattern noise may be simply added in the other range except the reference range. The reference range may mean a range of pixel values corresponding to a range between a preset lowest minimum reference level $TH_L$ and a preset maximum reference level $TH_H$. For example, referring to FIG. 11, the weight value w may be varied depending on the reference level Th within the reference range.

For example, in the input image shown in FIG. 10, one color is comprised of 2×2 unit pixel group, and one microlens is disposed per unit pixel group. For example, in G unit pixel group, the respective sub-unit pixels may be represented as P(x,y), P(x+1,y), P(x,y+1) and P'(x+1,y+1). At this time, the first fixed pattern noise SP and the second fixed pattern noise NP depending on saturation of the G sub-unit pixels may be removed (or cancelled) from the G-pixel image by weighted average based on the weight value w of FIG. 11 in accordance with Equation 3.

$$P'(x,y)=P(x,y)-\omega \cdot SP-(1-\omega) \cdot NP \quad \text{<Equation 3>}$$

That is, the fixed pattern remover 610 may combine (ω·SP+(1−ω)·NP) the first fixed pattern noise SP with the second fixed pattern noise NP by applying the weight values ω corresponding to the respective pixels of the raw image, thereby generating the final fixed pattern noise. Also, the fixed pattern remover 610 may output a revised image (O, combination image of P'(x,y)) by subtracting the final fixed pattern noise from the raw image I. For example, referring to FIG. 11, the final fixed pattern noise may be calculated by applying 0 to the weight value when a predetermined (or, alternatively, desired) pixel P(x,y) is less than or equal to the preset lowest reference level, applying 1 to the weight value when the predetermined (or, alternatively, desired) pixel P(x,y) is equal to or greater than the preset highest reference level, and applying the weight value corresponding to the pixel value when the predetermined (or, alternatively, desired) pixel P(x,y) is within the reference range (between $TH_L$ and $TH_H$). it is called "a hard decision".

The representative value for determining the weight is calculated to use the maximum value within the ROI with the same color as the color of the center pixel. For example, if the center pixel is a red color, the representative value is calculated the maximum of the red color within the ROI and puts it into the following weighting function to calculate the weight. It may be called "a soft thresholding."

Figure 12:
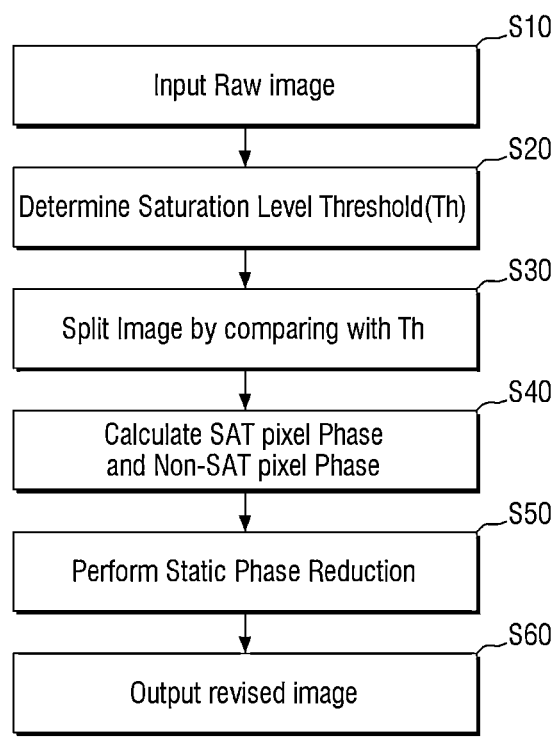
FIG. 12 is a flow chart illustrating an image processing method of an image processing device according to some example embodiments.

FIG. 12 is a flow chart illustrating an image processing method of an image processing device according to some example embodiments.

Referring to FIG. 8, when the image processing device receives the raw image I from the image sensor 200 (FIG. 1) (S10), the image processing device determines the reference level Th and/or the weight value ω from the raw image (S20).

In accordance with some example embodiments, the reference level Th and the weight value ω may be defined by user setting, or may be values that are defined by being pre-learned through machine learning in accordance with some example embodiments. Alternatively, in accordance with some example embodiments, the reference level Th and the weight value ω may be values that are adaptively set depending on the image sensor or a photographed situation. The image processing device may also determine a predetermined (or, alternatively, desired) reference range based on the determined reference level. The reference level may be used when hard thresholding for determining whether a pixel is saturated is performed, or may be used when soft thresholding, in which the first fixed pattern noise SP and the second fixed pattern noise NP are combined into the final fixed pattern noise by applying the weight value ω thereto, is performed.

The image processing device classifies the saturation pixels and the non-saturation pixels based on the reference level Th (S30) (for example, into saturation pixel groupings and non-saturation pixel groupings). For example, when at least one pixel among pixels of a specific color X belonging to a predetermined (or, alternatively, desired) kernel A has a pixel value of the reference level or more, all pixels of the corresponding color X belonging to the same kernel A are determined as saturation pixels, so that a first fixed pattern noise SP is calculated. When all pixels of another color (different from X) in the same kernel A have a pixel value less than the reference level, all pixels of the corresponding color are determined as non-saturation pixels, so that a second fixed pattern noise NP is calculated (S40).

The image processing device combines the first fixed pattern noise SP with the second fixed pattern noise NP through soft thresholding to generate the final fixed pattern noise (S50), and removes the final fixed pattern noise from the raw image I (S60). That is, the image processing device removes the final fixed pattern noise from the raw image to generate a revised image having high resolution. In according with some example embodiments, a final static image may be generated by weighted averaging a first phase image and a second phase image. To perform the weighted averaging, the image processing device may store each weight value corresponding to each sub-reference value of a pixel through mapping in accordance with some example embodiments, or may store an arithmetic expression that outputs a weight value preset (or, alternatively, desired)_ or pre-learned through machine learning (e.g., having been learned or determined according to a machine learning method) to correspond to a sub-reference value in accordance with some example embodiments.

Figure 13:
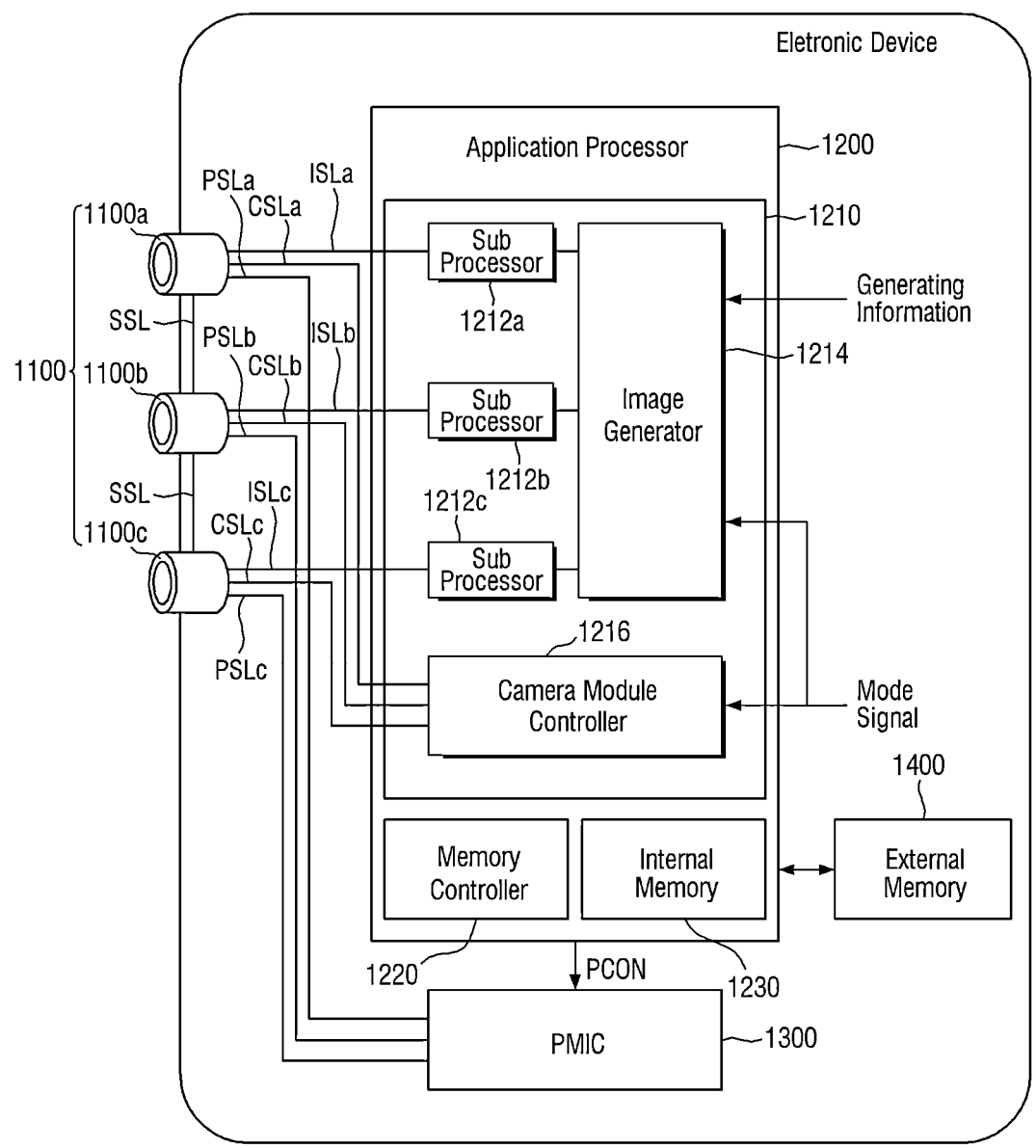
FIG. 13 is a block diagram of an electronic device including a multi-camera module according to some example embodiments of the present disclosure.
Figure 14:
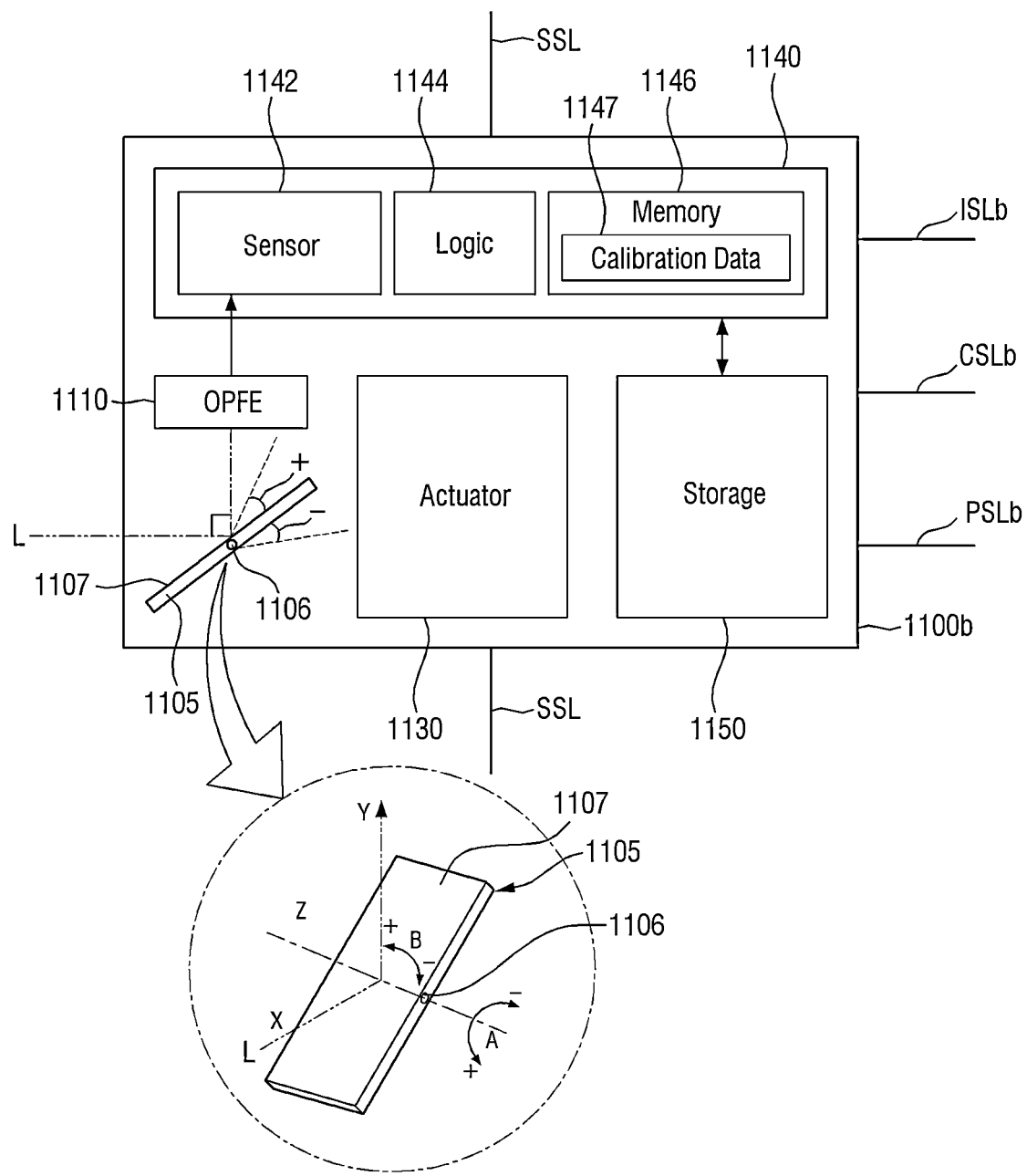
FIG. 14 is a detailed block diagram of the multi-camera module of FIG. 13.

FIG. 13 is a block diagram of an electronic device including a multi-camera module according to some example embodiments of the present disclosure. FIG. 14 is a detailed block diagram of the multi-camera module of FIG. 13.

Referring to FIG. 13, an electronic device 1000 may include a camera module group 1100, an application processor 1200, a power management integrated circuit (PMIC) 1300, and an external memory 1400.

The camera module group 1100 may include a plurality of camera modules 1100a, 1100b, and 1100c. FIG. 13 illustrates that the camera module group 1100 includes three camera modules, but the present disclosure is not limited thereto. Alternatively, the camera module group 1100 may include only two camera modules. Alternatively, the camera module group 1100 may include n camera modules (where n is a natural number of 4 or greater).

The structure of the camera module 1100b will hereinafter be described with reference to FIG. 14. The description that follows may be directly applicable to the other camera modules of the camera module group 1100, e.g., the camera modules 1100a and 1100c.

Referring to FIG. 14, the camera module 1100b may include a prism 1105, an optical path folding element (OPFE) 1110, an actuator 1130, an image sensing apparatus 1140, and a storage unit 1150.

The prism 1105 may include a reflective surface 1107 of a light-reflecting material and may thus change the path of light L incident from the outside.

In some example embodiments, the prism 1105 may change the path of light L incident in a first direction X to a second direction Y, which is perpendicular to the first direction X. Also, the prism 1105 may change the path of the light L incident in the first direction X to the second direction Y by rotating the light L in an A or B direction from a central axis 1106 of the reflective surface 1107. In this case, the OPFE 1110 may move in a third direction Z, which is perpendicular to the first and second directions X and Y.

In some example embodiments, the maximum rotation angle of the prism 1105 may be 15 degrees or less in a plus A direction and 15 degrees of greater in a minus A direction, but the present disclosure is not limited thereto.

In some example embodiments, the prism 1105 may move at an angle of about 20°, about 10° to 20°, or about 15° to about 20° in a plus B or minus B direction. The angle by which the prism 1105 moves may be the same in both the plus B direction and the minus B direction or may be almost similar with a difference of only about 1°.

In some example embodiments, the prism 1105 may move in the third direction Z, which is parallel to the direction in which the central axis 1106 of the reflective surface 1107 extends.

The OPFE 1110 may include, for example, a group of m optical lenses (where m is a natural number). The m optical lenses may be moved in the second direction Y to change the optical zoom ratio of the camera module 1100b. For example, if the default optical zoom ratio of the camera module 1100b is Z, the optical zoom ratio of the camera module 1100b may be changed to 3Z or 5Z (or greater) by moving the m optical lenses of the OPFE 1110.

The actuator 1130 may move the OPFE 1110 or an optical lens to a particular location. For example, the actuator 1130 may adjust the location of the optical lens such that an image sensor 1142 may be located at the focal length of the optical lens for a precise sensing.

The image sensing apparatus 1140 may include the image sensor 1142, a control logic 1144, and a memory 1146. The image sensor 1142 may sense an image of a target object using the light L provided thereto via the optical lens. The control logic 1144 may control the general operation of the camera module 1100b. For example, the control logic 1144 may control the operation of the camera module 1100b in accordance with control signals provided via a control signal line CSLb.

The memory 1146 may store information necessary for the operation of the camera module 1100b, such as calibration data 1147. The calibration data 1147 may include information necessary for generating image data using the light L. The calibration data 1147 may include, for example, degree-of-rotation information, focal length information, and optical axis information. In a case where the camera module 1100*b* is implemented as a multi-state camera whose focal distance changes in accordance with the location of the optical lens, the calibration data 1147 may include focal distances for different locations (or different states) of the optical lens and autofocusing information.

The storage unit 1150 may store image data sensed by the image sensor 1142. The storage unit 1150 may be disposed on the outside of the image sensing apparatus 1140 and may be implemented as being stacked on a sensor chip that forms the image sensing apparatus 1140. In some example embodiments, the storage unit 1150 may be implemented as an electrically erasable programmable read-only memory (EEPROM), but the present disclosure is not limited thereto.

Referring to FIGS. 13 and 14, in some example embodiments, the camera modules 1100*a*, 1100*b*, and 1100*c* may include their own actuators 1130. The camera modules 1100*a*, 1100*b*, and 1100*c* may include the same calibration data 1147 or different calibration data 1147 depending on the operation of their own actuators 1130.

In some example embodiments, one of the camera modules 1100*a*, 1100*b*, and 1100*c*, for example, the camera module 1100*b*, may be a folded lens-type camera module including the prism 1105 and the OPFE 1110, and the other camera modules, e.g., the camera modules 1100*a* and 1100*c*, may be vertical camera modules not including the prism 1105 and the OPFE 1110. However, the present disclosure is not limited to this.

In some example embodiments, the camera module 1100*c* may be, for example, a depth camera capable of extracting depth information using infrared (IR) light. In this case, the application processor 1200 may generate a three-dimensional (3D) depth image by merging image data provided by the camera module 1100*c* and image data provided by the other camera modules, e.g., the camera modules 1100*a* and 1100*b*.

In some example embodiments, at least two of the camera modules 1100*a*, 1100*b*, and 1100*c* may have different fields of view. In this case, at least two of the camera modules 1100*a*, 1100*b*, and 1100*c*, for example, the camera modules 1100*a* and 1100*b*, may have different optical lenses, but the present disclosure is not limited thereto.

Also, in some example embodiments, the camera modules 1100*a*, 1100*b*, and 1100*c* may have different fields of view. In this case, the camera modules 1100*a*, 1100*b*, and 1100*c* may have different optical lenses, but the present disclosure is not limited thereto.

In some example embodiments, the camera modules 1100*a*, 1100*b*, and 1100*c* may be disposed to be physically separate from one another. That is, the camera modules 1100*a*, 1100*b*, and 1100*c* may not share the sensing area of a single image sensor 1142 together, but independent image sensors 1142 may be disposed in the camera modules 1100*a*, 1100*b*, and 1100*c*.

Referring again to FIG. 13, the application processor 1200 may include an image processor 1210, a memory controller 1220, and an internal memory 1230. The application processor 1200 may be implemented as being separate from the camera modules 1100*a*, 1100*b*, and 1100*c*. For example, the application processor 1200 and the camera modules 1100*a*, 1100*b*, and 1100*c* may be implemented as separate semiconductor chips.

The image processor 1210 may include a plurality of sub-image processors 1212*a*, 1212*b*, and 1212*c*, an image generator 1214, and a camera module controller 1216.

The image processor 1210 may include as many sub-image processors as there are camera modules, e.g., a plurality of sub-image processors 1212*a*, 1212*b*, and 1212*c* corresponding to the camera modules 1100*a*, 1100*b*, and 1100*c*, respectively.

Image data generated by the camera modules 1100*a*, 1100*b*, and 1100*c* may be provided to the sub-image processors 1212*a*, 1212*b*, and 1212*c* via image signal lines ISLa, ISLb, and ISLb, which are separate from one another. For example, the image data generated by the camera module 1100*a* may be provided to the sub-image processor 1212*a* via the image signal line ISLa, the image data generated by the camera module 1100*b* may be provided to the sub-image processor 1212*b* via the image signal line ISLb, and the image data generated by the camera module 1100*c* may be provided to the sub-image processor 1212*c* via the image signal line ISLc. The transmission of the image data may be performed via, for example, a mobile industry processor interface (MIPI)-based camera serial interface (CIS), but the present disclosure is not limited thereto.

In some example embodiments, a single sub-image processor may be disposed to correspond to a plurality of camera modules. For example, the sub-image processors 1212*a* and 1212*c* may be incorporated into a single integrated sub-image processor, and the image data provided by the camera module 1100*a* or the image data provided by the camera module 1100*c* may be selected by a selection element (e.g., a multiplexer) and may then be provided to the integrated sub-image processor.

The image data provided to each of the sub-image processors 1212*a*, 1212*b*, and 1212*c* may be provided to the image generator 1214. The image generator 1214 may generate an output image using the image data provided thereto from each of the sub-image processors 1212*a*, 1212*b*, and 1212*c*, in accordance with image generating information (e.g., the Generating Information of FIG. 14) or a mode signal (e.g., the Mode Signal of FIG. 14).

Specifically, the image generator 1214 may generate an output image by merging at least some of the image data provided by the camera modules 1100*a*, 1100*b*, and 1100*c*, which have different fields of view, in accordance with the image generating information or the mode signal. Also, the image generator 1214 may generate an output image by selecting one of the image data generated by the camera modules 1100*a*, 1100*b*, and 1100*c*, which have different fields of view, in accordance with the image generating information or the mode signal.

In some example embodiments, the image generating information may include a zoom signal or a zoom factor. In some example embodiments, the mode signal may be, for example, a signal based on a mode selected by a user.

In a case where the image generating information is a zoom signal or a zoom factor and the camera modules 1100*a*, 1100*b*, and 1100*c* have different fields of view, the image generator 1214 may perform different operations depending on the type of zoom signal. For example, if the zoom signal is a first signal, the image data provided by the camera module 1100*a* and the image data provided by the camera module 1100*c* may be merged together, and an output image may be generated using the merged image data and the image data provided by the camera module 1100*b*, and if the zoom signal is a second signal, which is different from the first signal, one of the image data provided by the camera module 1100a, the image data provided by the camera module 1100b, and the image data provided by the camera module 1100c may be chosen, and an output image may be generated using the chosen image data. However, the present disclosure is not limited to this example. The method to process image data may vary, as necessary.

In some example embodiments, the image generator 1214 may receive a plurality of image data having different exposure times from at least one of the sub-image processors 1212a, 1212b, and 1212c and may perform high-dynamic range processing on the plurality of image data, thereby generating merged image data with an enhanced dynamic range.

The camera module group 1100 may include the image sensing apparatus 200 of FIG. 1.

The ISP 100 of FIG. 1 may be implemented inside the camera module group 1100 of FIG. 14, in the sub-image processors 1212a, 1212b, and 1212c of FIG. 13, or in the image generator 1214 of FIG. 13.

The camera module controller 1216 may provide control signals to the camera modules 1100a, 1100b, and 1100c. The control signals provided by the camera module controller 1216 may be provided to the camera modules 1100a, 1100b, and 1100c via the control signal lines CSLa, CSLb, and CSLc, which are separate from one another.

One of the camera modules 1100a, 1100b, and 1100c, for example, the camera module 1100b, may be designated as a master camera in accordance with the mode signal or the image generating information, which includes a zoom signal, and the other camera modules, e.g., the camera modules 1100a and 1100c, may be designated as slave cameras. This type of information may be included in a control signal and may then be provided to the camera modules 1100a, 1100b, and 1100c via the control signal lines CSLa, CSLb, and CSLc, which are separate from one another.

Master and slave camera modules may be changed in accordance with a zoom factor or the mode signal. For example, if the camera module 1100a has a wider field of view, but a zoom ratio with a smaller zoom factor, than the camera module 1100b, the camera module 1100b may operate as a master, and the camera module 1100a may operate as a slave. On the contrary, if the camera module 1100a has a zoom ratio with a greater zoom factor than the camera module 1100b, the camera module 1100a may operate as a master, and the camera module 1100b may operate as a slave.

In some example embodiments, the control signals provided from the camera module controller 1216 to the camera modules 1100a, 1100b, and 1100c may include a sync enable signal. For example, if the camera module 1100b is a master camera and the camera modules 1100a and 1100c are slave cameras, the camera module controller 1216 may transmit the sync enable signal to the camera module 1100b. The camera module 1100b may receive the sync enable signal, may generate a sync signal based on the sync enable signal, and may provide the sync signal to the camera modules 1100a and 1100c via sync signal lines SSL. The camera modules 1100a, 1100b, and 1100c may transmit image data to the application processor 1200 in synchronization with the sync signal.

In some example embodiments, the control signals provided from the camera module controller 1216 to the camera modules 1100a, 1100b, and 1100c may include mode information corresponding to the mode signal provided to the camera modules 1100a, 1100b, and 1100c. The camera modules 1100a, 1100b, and 1100c may operate in one of first second operating modes, which are associated with the speed of sensing, in accordance with the mode information.

In the first operating mode, the camera modules 1100a, 1100b, and 1100c may generate an image signal at a first speed (e.g., generate an image signal of a first frame rate), may encode the image signal at a second speed, which is higher than the first speed (e.g., encode the image signal at a second frame rate, which is higher than the first frame rate), and may transmit the encoded image signal to the application processor 1200. Here, the second speed may be less than 30 times the first speed.

The application processor 1200 may store a received image signal, e.g., an encoded image signal, in the internal memory 1230 or in the external memory 1400, may read and decode the encoded image signal from the internal memory 1230 or the external memory 1400, and may display image data generated based on the decoded image signal. For example, the decoding of the encoded image signal may be performed by the sub-processors 1212a, 1212b, and 1212c of the image processing apparatus 1210, and image processing may be performed on the decoded image signal.

In the second operating mode, the camera modules 1100a, 1100b, and 1100c may generate an image signal at a third speed, which is lower than the first speed (e.g., generate an image signal of a third frame rate, which is lower than the first frame rate) and may transmit the image signal to the application processor 1200. The image signal transmitted to the application processor 1200 may be a non-encoded signal. The application processor 1200 may perform image processing on the image signal received from the camera modules 1100a, 1100b, and 1100c or may store the received image signal in the internal memory 1230 or the external memory 1400.

The PMIC 1300 may supply power, for example, a power supply voltage, to the camera modules 1100a, 1100b, and 1100c. For example, the PMIC 1300 may supply first power to the camera module 1100a via a power signal line PSLa, second power to the camera module 1100b via a power signal line PSLb, and third power to the camera module 1100c via a power signal line PSLc, under the control of the application processor 1200.

The PMIC 1300 may generate power corresponding to each of the camera modules 1100a, 1100b, and 1100c and control the level of the power in response to a power control signal PCON from the application processor 1200. The power control signal PCON may include power control signals for different operating modes of the camera modules 1100a, 1100b, and 1100c. For example, the operating modes of the camera modules 1100a, 1100b, and 1100c may include a low power mode, in which case, the power control signal PCON may include information indicating which camera module is to operate in the low power mode and information indicating the level of power to be set. The level of power provided may be the same for all the camera modules 1100a, 1100b, and 1100c or may differ from one camera module to another camera module. Also, the level of power provided may be dynamically changed.

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about"

or "substantially," it will be understood that these values and shapes should be construed as including a manufacturing or operational tolerance (e.g., ±10%) around the stated numerical values or shapes.

The sensing device 1 (or other circuitry, for example, the image sensor 200, row driver 220, CDS 230, ADC 250, ramp signal generator 260, timing generator 270, control register block 280, buffer 290, display unit 300, DSP 400, camera control 410, ISP 100, interface 420, electronic device 1000, camera module group 1100, application processor 1200, PMIC 1300, external memory 1400 and subcomponents thereof) may include hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), While the present disclosure has been shown and described with reference to various example embodiments thereof, it will be understood by those skilled in the art that various changes in form and details may be made therein without departing from the spirit and scope of the present disclosure as defined by the appended claims and their equivalents.

What is claimed is:

1. An image processing device comprising:
   an image sensor configured to sense and output a raw image; and
   an image signal processor configured to compare pixel values of the raw image with a reference level to classify a saturation color image and a non-saturation color image,
   calculate a first fixed pattern noise from the saturation color image,
   calculate a second fixed pattern noise from the non-saturation color image,
   generate a final fixed pattern noise by combining the first fixed pattern noise with the second fixed pattern noise, and
   output a revised image by subtracting the final fixed pattern noise from the raw image.

2. The image processing device of claim 1, wherein
   at least one of the pixel values of the raw image in a kernel is classified into a saturation pixel grouping based on at least one of the pixel values being the reference level or more, and
   at least one of the pixel values of the raw image in the kernel is classified into a non-saturation pixel grouping based on at least one of the pixel values being less than the reference level.

3. The image processing device of claim 2, wherein
   based on at least one of first color pixels in the kernel belongs to the saturation pixel grouping, all the first color pixels are classified into the saturation color image, and
   based on all of second color pixels in the kernel belonging to the non-saturation pixel grouping, the second color pixels are classified into the non-saturation color image.

4. The image processing device of claim 1, wherein the reference level is a value that is adaptively set depending on the image sensor or a photographed situation.

5. The image processing device of claim 4, wherein the final fixed pattern noise is generated by weighted averaging the first fixed pattern noise and the second fixed pattern noise based on a weight value corresponding to each pixel of the raw image.

6. The image processing device of claim 1, wherein the image sensor includes:
   a pixel array including a plurality of unit pixel groups in a Bayer pattern, the unit pixel group including a plurality of subpixel arrays; and
   a readout circuit configured to sample a pixel signal from the pixel array to output the raw image, and
   at least two subpixels of the unit pixel group share one microlens.

7. An image processing device connected to an image sensor, the image processing device comprising:
   processing circuitry configured to
   compare pixel values of a raw image based on a reference level to classify the pixel values into a saturation color image and a non-saturation color image;
   generate a first fixed pattern noise in consideration of a saturation pixel from the saturation color image;
   generate a second fixed pattern noise from the non-saturation color image;
   generate a final fixed pattern noise by combining the first fixed pattern noise with the second fixed pattern noise; and
   generate a revised image by removing the final fixed pattern noise from the raw image.

8. The image processing device of claim 7, wherein the processing circuitry is further configured to
   classify at least one of pixel values of the raw image belonging to a kernel into a saturation pixel grouping based on at least one of the pixel values being the reference level or more, and
   classify at least one of the pixel values into a non-saturation pixel grouping based on at least one of the pixel values being less than the reference level.

9. The image processing device of claim 7, wherein processing circuitry is further configured to output the reference level and a weight value based on the pixel values of the raw image.

10. The image processing device of claim 9, wherein processing circuitry is further configured to adaptively set the reference level depending on the image sensor or a situation in which a subject is photographed.

11. The image processing device of claim 9, wherein the processing circuitry is further configured to generate the final fixed pattern noise by applying weight values corresponding to each pixel of the raw image to weighted-average the first fixed pattern noise and the second fixed pattern noise.

12. The image processing device of claim 8, wherein the processing circuitry is further configured to
   classify all first color pixels into the saturation color image based on at least one of the first color pixels belonging to the kernel belonging to the saturation pixel grouping, and
   classify second color pixels into the non-saturation color image based on all of the second color pixels belonging to the kernel belonging to the non-saturation pixel grouping.

13. The image processing device of claim 7, wherein
   the image sensor includes a pixel array including a plurality of unit pixel groups in a Bayer pattern, the unit pixel group being below at least one microlens; and
   the processing circuitry is further configured to output the raw image from a pixel signal from the pixel array.

14. An image processing method of an image sensing device, the image processing method comprising:
- classifying a raw image received from an image sensor into a saturation color image and a non-saturation color image by comparing the raw image with a reference level per pixel;
- calculating a first fixed pattern noise from the saturation color image;
- calculating a second fixed pattern noise from the non-saturation color image;
- generating a final fixed pattern noise by combining the first fixed pattern noise with the second fixed pattern noise; and
- outputting a revised image by removing the final fixed pattern noise from the raw image.

15. The image processing method of claim 14, wherein the classifying the raw image includes
- classifying into a saturation pixel grouping based on at least one of pixel values of the raw image in a kernel being the reference level or more, and
- classifying into a non-saturation pixel grouping based on at least one of the pixel values being less than the reference level.

16. The image processing method of claim 15, wherein a plurality of pixels of a color in the saturation pixel grouping are all classified into the saturation color image.

17. The image processing method of claim 15, wherein the reference level is set by user setting or learning through machine learning.

18. The image processing method of claim 17, wherein the reference level and a weight value are respectively selected from a plurality of reference levels and a plurality of weight values based on the pixel values of the raw image.

19. The image processing method of claim 18, wherein the final fixed pattern noise is generated by respectively applying the weight values selected to correspond to the pixel values of the raw image to weighted-average the first fixed pattern noise and the second fixed pattern noise.

20. The image processing method of claim 18, wherein the plurality of reference levels and weight values are adaptively set depending on the image sensing device or a situation in which a subject is photographed.

* * * * *